(12) United States Patent
O'Shea

(10) Patent No.: US 10,883,275 B2
(45) Date of Patent: Jan. 5, 2021

(54) TRANSFORMER-INTEGRATED GUARDRAIL APPARATUS AND KIT

(71) Applicant: CV INTERNATIONAL, INC., Bend, OR (US)

(72) Inventor: Alan Michael O'Shea, Bend, OR (US)

(73) Assignee: CV International, Inc., Bend, OR (US)

( * ) Notice: Subject to any disclaimer, the term of this patent is extended or adjusted under 35 U.S.C. 154(b) by 138 days.

(21) Appl. No.: 16/016,067

(22) Filed: Jun. 22, 2018

(65) Prior Publication Data

US 2019/0390461 A1 Dec. 26, 2019

(51) Int. Cl.
*E04F 11/18* (2006.01)
*F16B 7/04* (2006.01)

(52) U.S. Cl.
CPC ...... *E04F 11/1846* (2013.01); *E04F 11/1817* (2013.01); *F16B 7/0433* (2013.01); *E04F 2011/187* (2013.01); *E04F 2011/1821* (2013.01); *Y10T 403/7141* (2015.01)

(58) Field of Classification Search
CPC .............. E04F 11/1817; E04F 11/1836; E04F 11/1846; E04F 2011/1821; E04F 2011/187; E04F 2011/1889; E04H 17/22; E04H 2017/1473; F16B 7/0433; Y10T 403/7071; Y10T 403/7129; Y10T 403/7141; Y10T 403/7171
USPC .... 403/374.5, 389, 391, 396; 256/64, 65.03, 256/65.14, 68
See application file for complete search history.

(56) References Cited

U.S. PATENT DOCUMENTS

| | | | |
|---|---|---|---|
| 2,546,929 A | | 3/1951 | Nampa |
| D331,529 S | * | 12/1992 | Reinklou ............ E04G 21/3233 D8/355 |
| 5,181,684 A | * | 1/1993 | Sager ........................ B62J 6/06 24/335 |
| 6,038,829 A | * | 3/2000 | Franks ...................... E04G 3/26 256/65.14 |

(Continued)

FOREIGN PATENT DOCUMENTS

DE 102010037619 A1 * 3/2012 ............ F16B 7/0433
WO 2008145419 12/2008

OTHER PUBLICATIONS

International Search Report and Written Opinion issued on International Application No. PCT/US2019/038710, dated Sep. 9, 2019, 10 pages.

(Continued)

*Primary Examiner* — Josh Skroupa
(74) *Attorney, Agent, or Firm* — Leber IP Law; David C. Robertson

(57) ABSTRACT

An apparatus and related kit for forming the apparatus that includes a modular perimeter guardrail assembly useful on top of electrical transformers found in industrial settings. The apparatus and kit includes a plurality of anchors, each said anchor providing a post support and removably attachable to an edge of an electrical transformer; a plurality of post assemblies, each post assembly removably attached to a corresponding one of said anchors in a vertical orientation; a plurality of brace assemblies, each brace assembly removably attached to at least two of said post assemblies; and at least one midrail clamp assembly capable of providing removable attachment to exactly two of said brace assemblies at a midpoint thereof.

24 Claims, 14 Drawing Sheets

(56) References Cited

U.S. PATENT DOCUMENTS

| | | | |
|---|---|---|---|
| 6,039,150 A | 3/2000 | Palmer | |
| 6,279,880 B1 | 8/2001 | Hawks, Jr. | |
| 6,474,900 B2* | 11/2002 | Feng | A63B 25/08 248/230.5 |
| 6,585,080 B2* | 7/2003 | Murray | E04G 21/3233 182/45 |
| 7,556,229 B2* | 7/2009 | Elliott | F16B 7/0433 224/536 |
| 7,784,744 B2* | 8/2010 | Becker | F16L 3/02 248/218.4 |
| 8,393,821 B2* | 3/2013 | Wiberg | F16B 7/0433 403/391 |
| 8,398,034 B2* | 3/2013 | Lambert | F16L 3/237 248/68.1 |
| 8,448,923 B1 | 5/2013 | Schad et al. | |
| D709,979 S* | 7/2014 | Prieto | D22/108 |
| 8,827,037 B2* | 9/2014 | Chilton | E04H 17/22 182/113 |
| 8,898,957 B2* | 12/2014 | Morrone, III | E06B 9/063 49/55 |
| 9,145,907 B2* | 9/2015 | Liang | F16B 7/0486 |
| 10,500,699 B2* | 12/2019 | Chang | B25B 5/102 |
| 2003/0042072 A1 | 3/2003 | Murray | |
| 2012/0031702 A1 | 2/2012 | Bissett et al. | |
| 2013/0086842 A1 | 4/2013 | Morrone, III | |
| 2014/0217345 A1* | 8/2014 | Stoffels | B60R 3/005 256/64 |
| 2016/0305152 A1* | 10/2016 | Kozyra | E04H 17/22 |

OTHER PUBLICATIONS

"Case Study: Handrails—NIE Power Station", Relinea, May 13, 2018, 2 pages.
"Walkways, Ladders and Handrails (ABI Power Station)", 949 Supplies Co., Ltd., May 13, 2018, pp. 1-3.
"Re-Grab Handrail System", Relinea, retrieved on line Jun. 22, 2018, 10 pages.

* cited by examiner

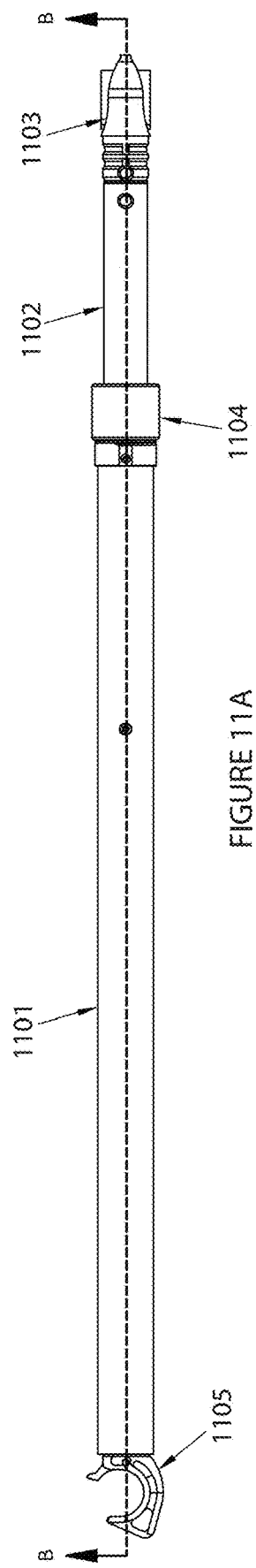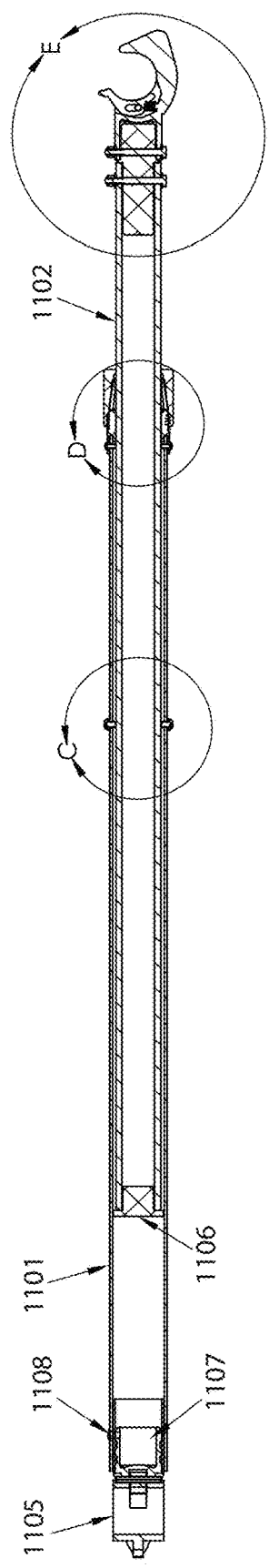
FIGURE 11A
FIGURE 11B

TRANSFORMER-INTEGRATED GUARDRAIL APPARATUS AND KIT

FIELD OF THE INVENTION

The present invention relates generally to fall prevention systems. More particularly, the invention provides a modular perimeter guardrail assembly on top of electrical transformers found in industrial settings.

BACKGROUND OF THE INVENTION

In the field of safety equipment related to industrial transformers, there are predominantly two existing manners by which a worker's safety is maintained while servicing transformer equipment. These commonly include mechanisms to prevent falls using a wearable body harness and corresponding tether affixed between the harness and transformer or using custom-built handrails permanently fixed to the transformer. If used in an industrial workplace setting, suitable regulatory compliance must be met for such mechanisms as set forth by the Occupational Safety and Health Administration (OSHA) of the United States Department of Labor or similar regulations which exist outside the United States.

Failure to comply with OSHA standards for workplace safety can result in significant fines and prosecution. Section 17(e) of the Occupational Safety and Health Act provides for a Class B misdemeanor criminal penalty, including imprisonment up to six months and substantial monetary fines if an employer's willful violation of any OSHA standard causes the death of an employee.

Although wearable safety harnesses and tethers are common in many industrial workplace settings and which may arrest a fall, they are cumbersome and prone to user errors in terms of either failure to properly adjust or attach the harness itself to the worker's body or complications related to tether including failure to securely attach the tether or entanglement. Because these only serve to arrest a fall rather than prevent falls completely, they are of limited usefulness. In industrial workplace settings related to servicing high voltage transformer equipment, entanglement may have dire consequences. As well, due the height of high voltage equipment, improperly secured tethers or maladjusted harnesses may have equally problematic outcomes should the user lose their footing.

Providing handrails atop industrial equipment is a commonly understood practice and is sometimes used in the context of electrical transformers for fall prevention. However, such handrail installations increase both the cost and complexity of transformer manufacture and installation. Due to variations in transformer design and construction, handrails in this context are custom built for permanent attachment. Depending upon the materials used, this may add significant cost and weight to any transformer implementation. As the handrails are of course only used intermittently for servicing the topmost parts of a transformer, such additional cost and weight considerations may not be justifiable. Further, permanent handrails may disadvantageously contribute to unwanted icing in locations where snow and ice buildup are likely.

The present invention overcomes one or more deficiencies of the prior art.

SUMMARY OF THE INVENTION

The present invention provides an apparatus and kit in terms of a transformer-integrated guardrail that may quickly and easily be assembled, disassembled, and likewise reassembled on the same transformer site or at another transformer site. Advantageously, the invention includes modular elements used interchangeably to form a guardrail in an integrated manner with the given transformer. The modular elements include post anchors, vertical posts, telescoping horizontal rails and guardrail connectors. The post anchors may themselves be removably or permanently affixed to the transformer, while the remaining elements may be easily installed to form a complete OSHA-compliant guardrail perimeter for workers atop the transformer. Due to the modular construction and telescoping capability of the horizontal rails, the invention may be resized at the job site so as to be used on transformers of varying size and shape without the need for custom manufacturing or cutting of railings or use of special tools.

In accordance with one aspect, the present invention provides a guardrail apparatus for use with an electrical transformer, the apparatus including: a plurality of anchors, each the anchor providing a post support and removably attachable to an edge of an electrical transformer; a plurality post assemblies, each the post assembly removably attached to a corresponding one of the anchors in a vertical orientation; and a plurality of brace assemblies, each the brace assembly removably attached to at least two of the post assemblies. The apparatus may optionally also include at least one midrail clamp assembly removably attached to exactly two of the brace assemblies at a midpoint thereof.

In accordance with another aspect, the present invention further provides a kit for a guardrail apparatus used with an electrical transformer, the kit including: a plurality of anchors, each the anchor capable of providing a post support and removable attachment to an edge of an electrical transformer; a plurality post assemblies, each the post assembly capable of providing removable attachment to a corresponding one of the anchors in a vertical orientation; a plurality of brace assemblies, each the brace assembly capable of providing removable attachment to at least two of the post assemblies; and at least one midrail clamp assembly capable of providing removable attachment to exactly two of the brace assemblies at a midpoint thereof.

These and other aspects will become apparent from the following drawings and detailed descriptions of exemplary embodiments.

BRIEF DESCRIPTION OF THE DRAWINGS

FIG. 11A is a side view of a brace assembly in accordance with the preferred embodiment of the present invention.

FIG. 11B is a side sectional view of the brace assembly taken along line B-B in FIG. 11.

DETAILED DESCRIPTION

The following detailed description provides examples of presently contemplated modes of implementing embodiments of the invention. This description is not to be taken in a limiting sense, but is made merely for the purpose of illustrating general principles of embodiments of the invention. The scope of the invention will be best defined by the claims.

The present invention is an apparatus and related kit for forming the apparatus. The invention presents a modular perimeter guardrail assembly useful on top of electrical transformers found in industrial settings. The invention may quickly and easily be assembled, disassembled, and likewise reassembled on the same or different transformer and serves to prevent workers from falling off the top to the given transformer.

Figure 1:
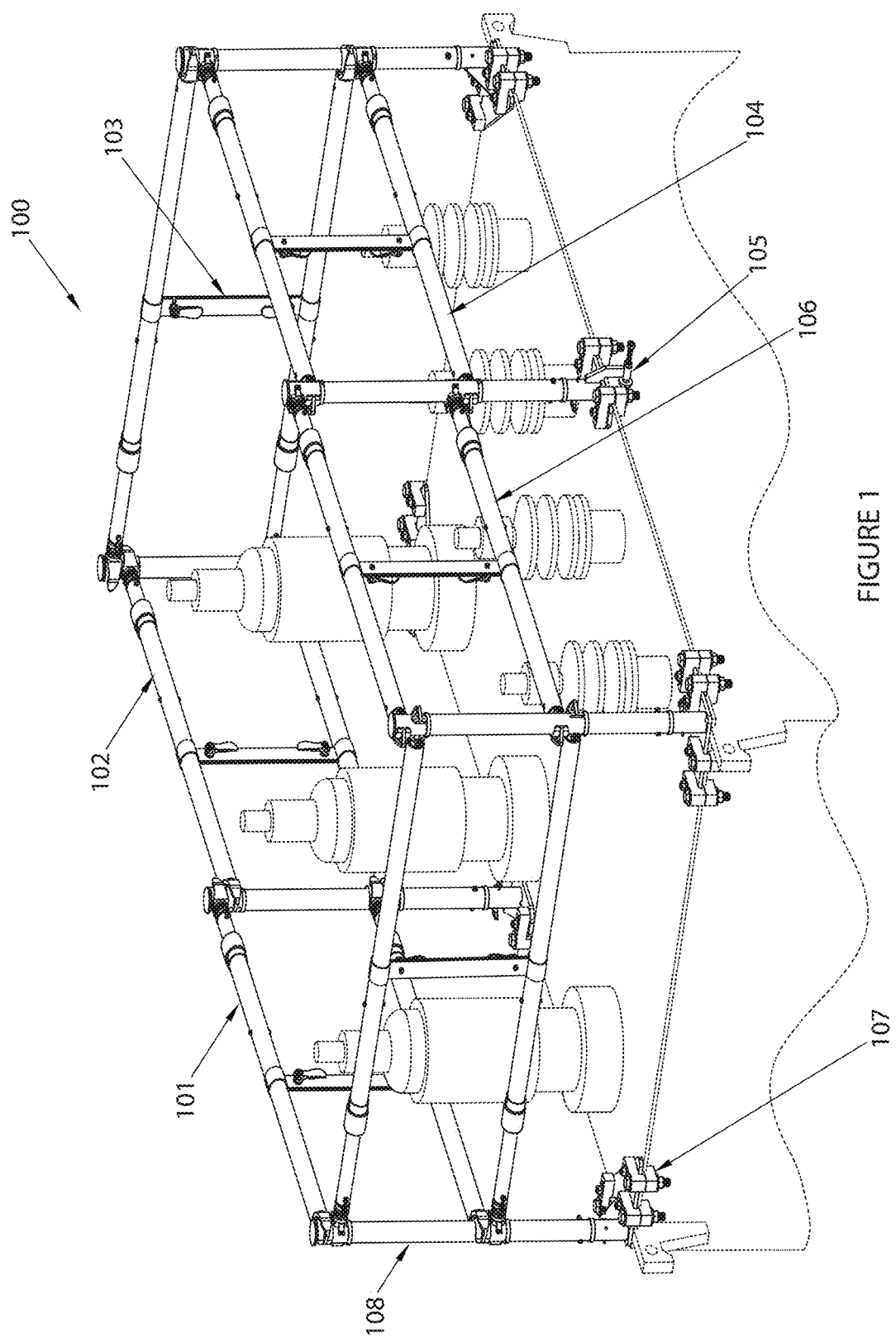
FIG. 1 shows three-dimensional view of a preferred embodiment of the present invention assembled and in place atop a cutaway portion of an electrical transformer.

One exemplary configuration of an assembled apparatus in accordance with a preferred embodiment of the present invention is illustrated by FIG. 1. In the preferred embodiment as shown, the invention is illustrated atop a transformer (shown in dotted line and partially cutaway). It should be understood that details of the transformer do not form part of the invention and may vary in accordance with the manner in which the present invention is implemented. In other words, the preferred embodiment as shown may vary in terms of number of sections, sides, and the particular configuration given the size and shape of the transformer upon which the present invention is used.

With reference to FIG. 1, a four-sided perimeter guardrail apparatus 100 in accordance with the preferred embodiment is shown though any number of sides and configurations may be possible without straying from the intended scope of the present invention. The primary components of the guardrail apparatus 100 as illustrated include horizontal and vertical elements along with interface elements which attach the horizontal and vertical elements to the transformer. The horizontal elements are formed by a plurality of brace assemblies while the vertical elements are formed by a plurality of post assemblies and midrail clamp assemblies.

In FIG. 1, six upper brace assemblies are shown with six corresponding lower brace assemblies. It may be seen from the configuration shown that adjacent upper brace assemblies 101 and 102 are staggered in a one-up, one-down arrangement. Likewise, adjacent lower brace assemblies 104 and 106 are also staggered in a one-up, one-down arrangement. In this manner, it should therefore be readily apparent that the pattern of one-up, one-down arrangement repeats around the entire perimeter of the guardrail apparatus 100 for each of the upper and lower brace assemblies. Each brace assembly itself will be described in further detail hereinbelow.

At the center of each brace assembly may be located a midrail clamp assembly 103. As shown, six midrail clamp assemblies are provided in the guardrail apparatus 100. While the number of midrail clamp assemblies may of course vary with the given configuration of the guardrail apparatus, it should be understood that one upper brace assembly and one lower brace assembly are intended to require one midrail clamp assembly tying the upper brace assembly to the lower brace assembly and located at their midpoint. The function of the midrail clamp assembly is to connect the upper and lower brace assemblies such that deflection of the brace assemblies is held within an allowable range. It should be readily apparent that such midrail clamp may not be necessary if the upper and lower braces deflection under load is otherwise within an allowable range. Factors related to whether the midrail clamp is used or not correspond to the inherent flexibility of the material used to form the upper and lower braces and also the length of telescoping of the brace assembly where the opportunity for deflection will increase as the telescoped length of the brace assembly increases.

In order to be OSHA-compliant, fall prevention guardrails must measure from between 45" (at the topmost hand rail) to 39" (at the lower guardrail) above the working surface. Other regulations of course may have different allowable ranges. Under no-load conditions, the guardrail apparatus 100 meets this requirement. Upon application of a 200 pound vertically force downwardly applied to the brace assemblies alone (i.e., without a midrail clamp assembly), deflection may be noncompliant with the OSHA requirements. However, insertion of the midrail clamp assembly between the upper and lower brace assemblies serves to connect the upper brace assembly (which functions as topmost handrail) and the lower brace assembly (which functions as a lower guardrail) together mechanically. This mechanical connection effectively distributes the applied load, thus reducing the resultant deflection from the imposed 200-pound vertical load. Consequently, the upper brace assembly (i.e., topmost handrail) is prevented from dropping below the minimum required 39" relative to the transformer surface. Each midrail clamp assembly itself will be described in further detail hereinbelow.

Each set of upper and lower brace assemblies with their corresponding midrail clamp assembly 103 are secured between a pair of vertical post assemblies 108. As seen in FIG. 1, each post assembly 108 is attached to the top surface of the transformer. While four corner and two middle post assemblies are shown, more or less may be provided in any given implementation of the present invention. Each post assembly itself will be described in further detail hereinbelow.

In the configuration as shown in FIG. 1, post anchors provide the interface between the top surface edge of the transformer and each vertical post assembly 108. Here, there are illustrated two center anchors 105 and four corner anchors 107. Each anchor 105, 107 are preferably attached to the peripheral edge of the transformer by integrated clamps which provides ease of attachment and removability. Alternatively, the anchors may be more permanently affixed to the edge of the transformer. Each center and corner anchor itself will be described in further detail hereinbelow.

It should be understood that the anchors, being either removably or more permanently affixed to the edge of the transformer, provide a mechanism for attachment of each vertical post assembly to which the pairs of brace assemblies are subsequently attached and tied together mechanically by way of the midrail clamp assemblies. The manner by which anchors, posts, braces, and midrail clamps are assembled affords a worker to quickly and intuitively assemble, disassemble, and reassemble any given configuration of the present inventive guardrail apparatus. In its state of being unassembled, the present inventive guardrail apparatus is provided as a kit.

The materials from which the anchors, posts, braces, and midrail clamps are fabricated are suitably selected for both their structural integrity, ability to withstand harsh outdoor environments, and ability to insulate workers from electrical shock. In particular, the anchors and midrail clamps should be formed of a suitably durable and corrosion resistant material such as but not limited to aluminum. The posts and braces should be similarly formed and may further include non-conductive qualities. Suitable materials for such posts and braces may include materials such as but not limited to polymer-based composites. The specific details of the anchors, posts, braces, and midrail clamps will now be described in further detail with regard to the remaining figures.

Figure 2A:
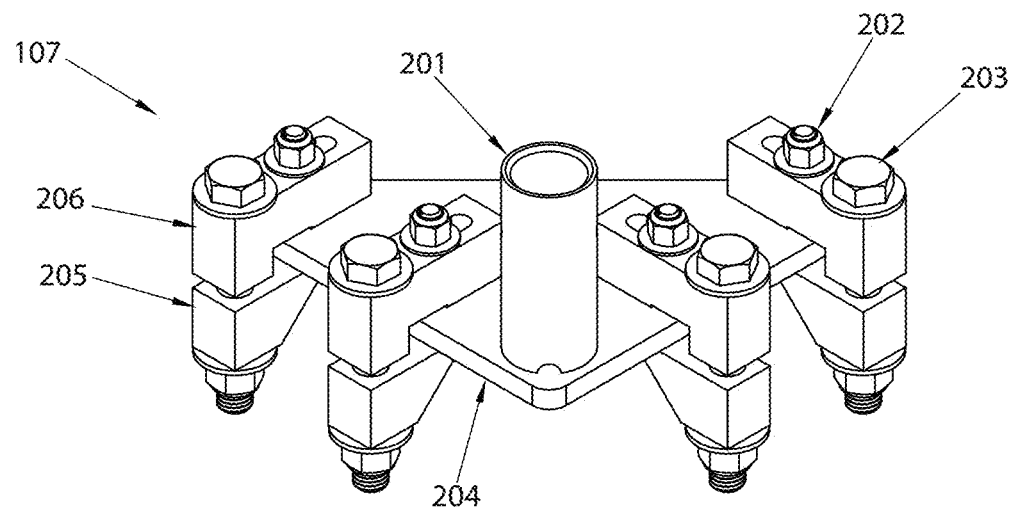
FIG. 2A is a perspective view of a corner anchor assembly in accordance with the preferred embodiment of the present invention.

With regard to FIG. 2A, there is illustrated a perspective view of a corner anchor assembly 107 in accordance with the preferred embodiment of the present invention. The corner anchor assembly 107 includes a corner base plate 204 upon which a post holder 201 is provided. The post holder forms a vertical tubular slot in which the base of a post assembly is removably engaged. As shown, each corner anchor assembly 107 includes a suitable number of clamping mechanisms which are formed by an upper clamp section 206 secured to the corner base plate 204 primarily by way of a nut 202 mounted on a threaded post (shown as element 400 in FIG. 4) that is integral with the corner base plate 204 along with a lower clamp section 205 secured to the upper clamp section via a thru-bolt and nut combination 203. In this manner, the upper and lower clamp sections effectively form a C-shaped clamp structure, or simply C-clamp structure. It is also shown in FIG. 2A that the upper clamp section 206 is slotted to allow horizontal adjustment.

Figure 2B:
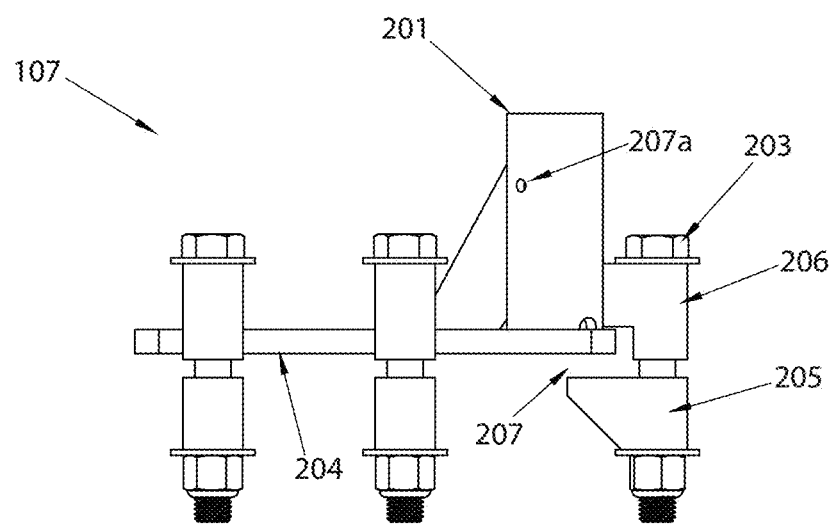
FIGS. 2B, 2C, and 2D are left-side, right-side, and top views of the corner anchor assembly shown in FIG. 2A.
Figure 2C:
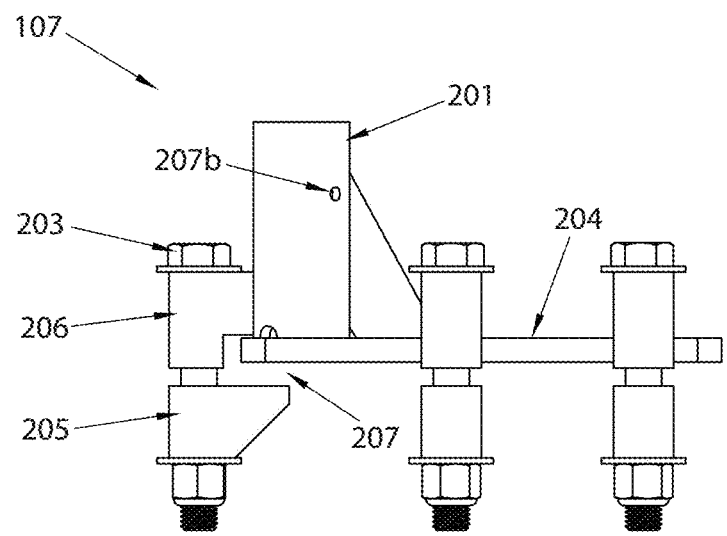
Figure 2D:
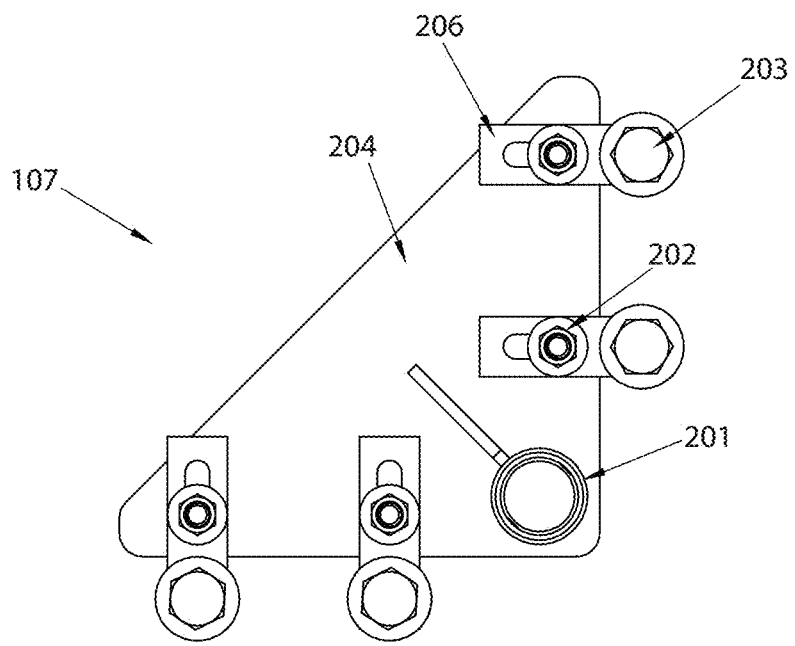

With regard to FIGS. 2B, 2C, and 2D, there are illustrated left-side, right-side, and top views of the corner anchor assembly 107 shown in FIG. 2A. It should be readily apparent that tightening of the thru-bolt and nut combination 203 results in movement of the lower clamp section 205 towards the upper clamp section 206. Such tightening reduces the space 207 between the underside of the corner base plate 204 and the topside of the lower clamp section 205. Likewise, loosening of the thru-bolt and nut combination 203 results in widening of the space 207. It should be understood that an outer peripheral edge found on typical surface decking of large industrial transformers are of a thickness suitable for the dimensional range created and adjustable within the space 207.

With specific regard to FIGS. 2B and 2C, there is visible two through holes 207a and 207b which are intended to align with a through hole located in the base of the pole assembly. Once the pole assembly is inserted, a removable locking pin (shown as element 607 in FIG. 6B) is used to prevent vertical movement of the pole assembly relative to the corner anchor assembly 107 thereby removably securing each pole assembly to its respective corner anchor assembly 107 and thus to the transformer. Though four such clamping mechanisms are illustrated as preferred given the intended lightweight nature of the overall inventive guardrail apparatus, it should be understood that the number may vary depending upon the size and weight of the post assembly.

Figure 3A:
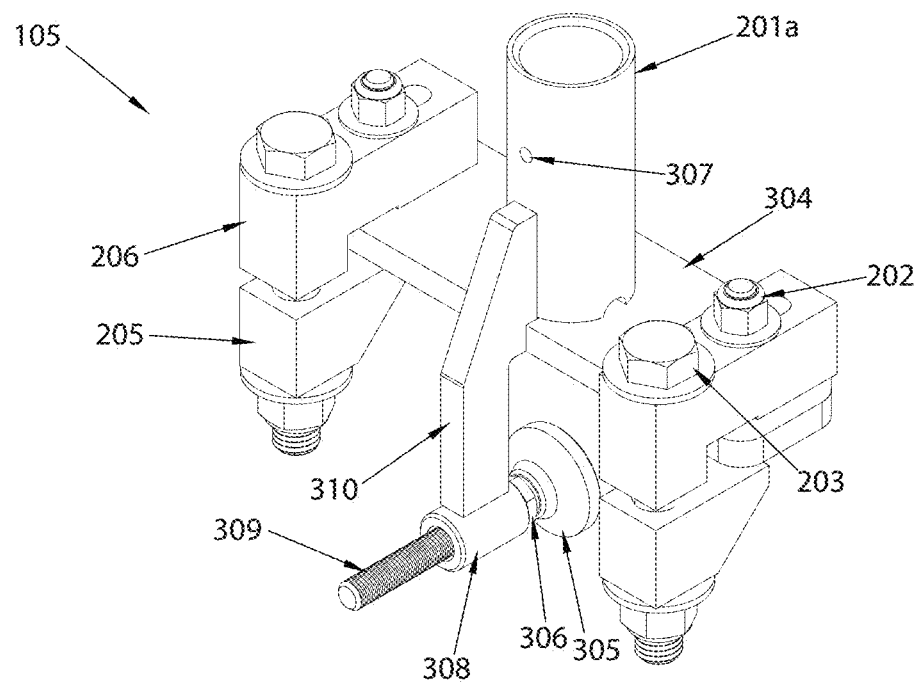
FIG. 3A is a perspective view of a center anchor assembly in accordance with the preferred embodiment of the present invention.
Figure 3B:
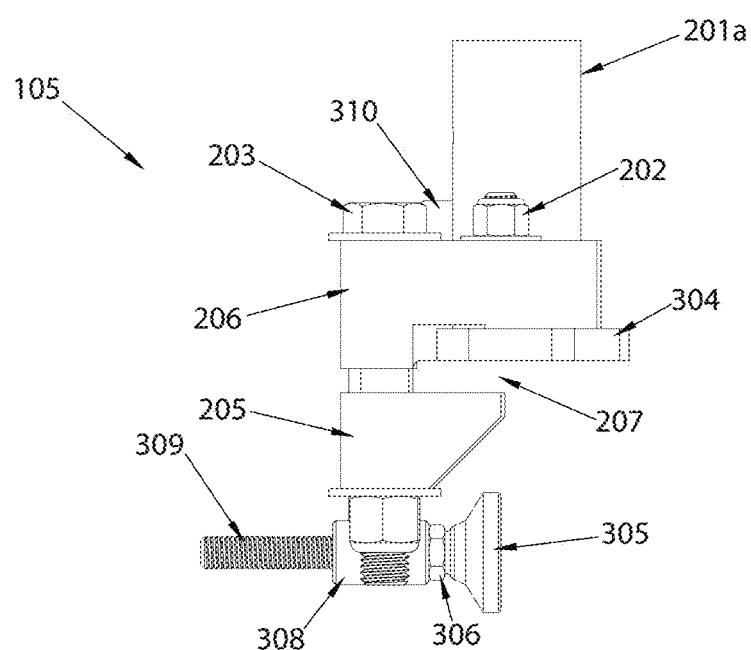
FIG. 3B is a side view of the center anchor assembly shown in FIG. 3A.

With regard to FIGS. 3A and 3B there are illustrated a perspective view and side view, respectively, of a center anchor assembly 105 in accordance with the preferred embodiment of the present invention. With regard to the center anchor assembly 105, it should be understood that the lower clamp section 205 and the upper clamp section 206 are both structurally and functionally identical in the center anchor assembly 105 as they are with the previously described corner anchor assembly so as to selectively widen or reduce the space 207 within which an edge of the transformer periphery is intended to be held.

The notable differences between corner and center anchor assemblies are the number of requisite lower and upper clamp sections and the arrangement of through hole 307 within the post holder 201a that allows for an additional clamping mechanism. As before, it should be understood that a removable locking pin (not shown) is provided to be inserted into the through hole 307 and a corresponding through hole (not shown) on the opposite side of the post holder 201a to removably retain a post assembly in the same manner as described above with regard to the corner anchor assembly.

In order to ensure lateral stability of the center anchor assembly 105, there is provided a support 310 which includes a tubular end 308 through which an adjustment pad 305 mounted on a threaded bolt 309 is movable. The threaded bolt 309 may be locked into place via a nut 306 after the adjustment pad 305 securely abuts the side of the transformer (seen in FIG. 1). In this manner, lateral stability of the center anchor assembly 105 is adjusted as desired.

Figure 4:
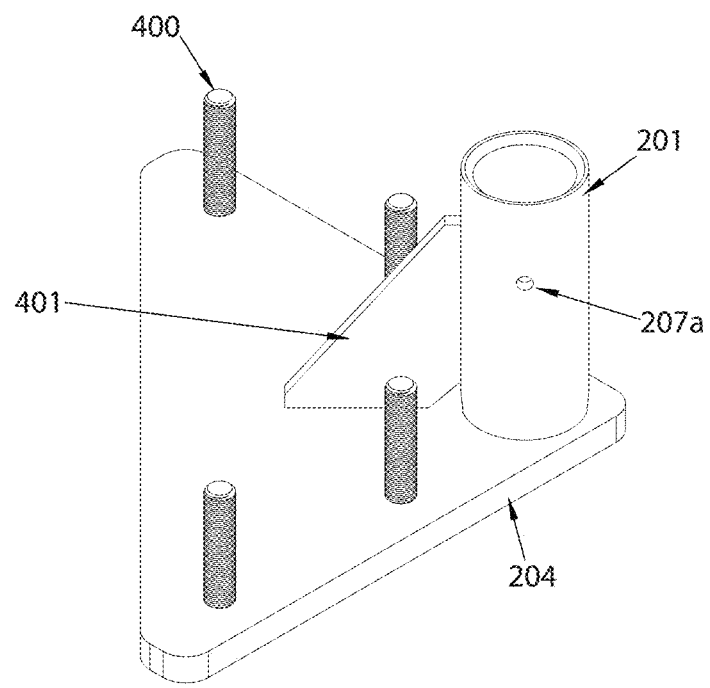
FIG. 4 is a perspective view of a base plate of the corner anchor shown in FIG. 2A.
Figure 5:
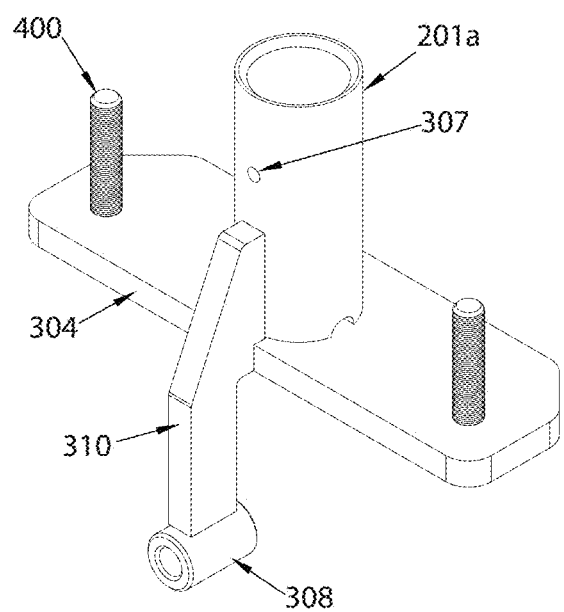
FIG. 5 is a perspective view of a base plate of the center anchor shown in FIG. 3A.

FIGS. 4 and 5 are provided to show, respectively, perspective views of the base plates of the corner anchor seen in FIG. 2A and the center anchor seen in FIG. 3A, except with their clamping mechanisms removed for clarity. Here, it is readily visible that threaded posts 400 are provided as integral part of the base plates, 204, 304. As well, a lateral support fin 401 is also clearly provided between the post holder 201 and base plate 204 with regard to the corner anchor while the same functionality occurs with regard to the center anchor via support 310.

Figure 6A:
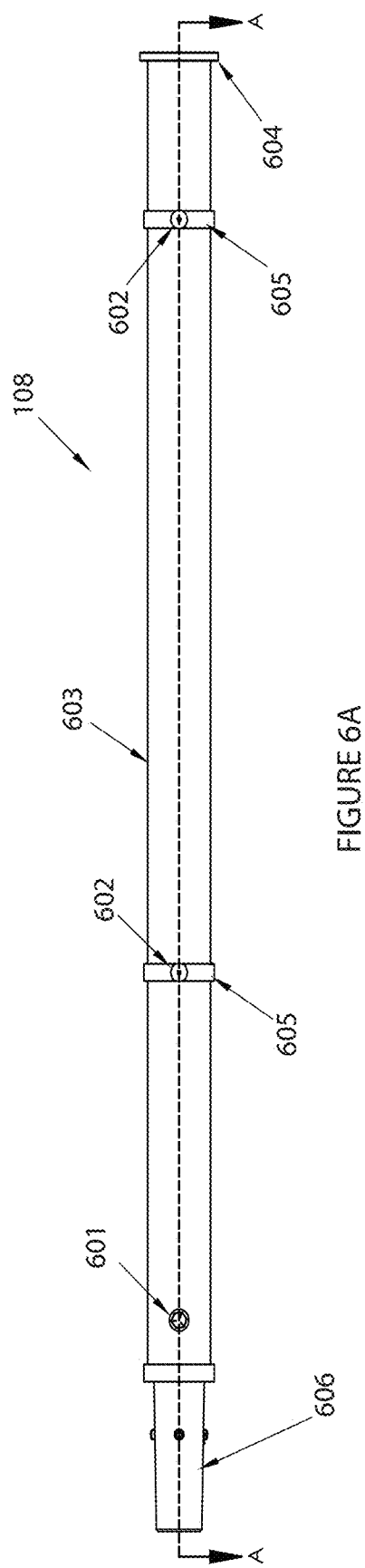
FIG. 6A is a side view of a post assembly in accordance with the preferred embodiment of the present invention.
Figure 6B:
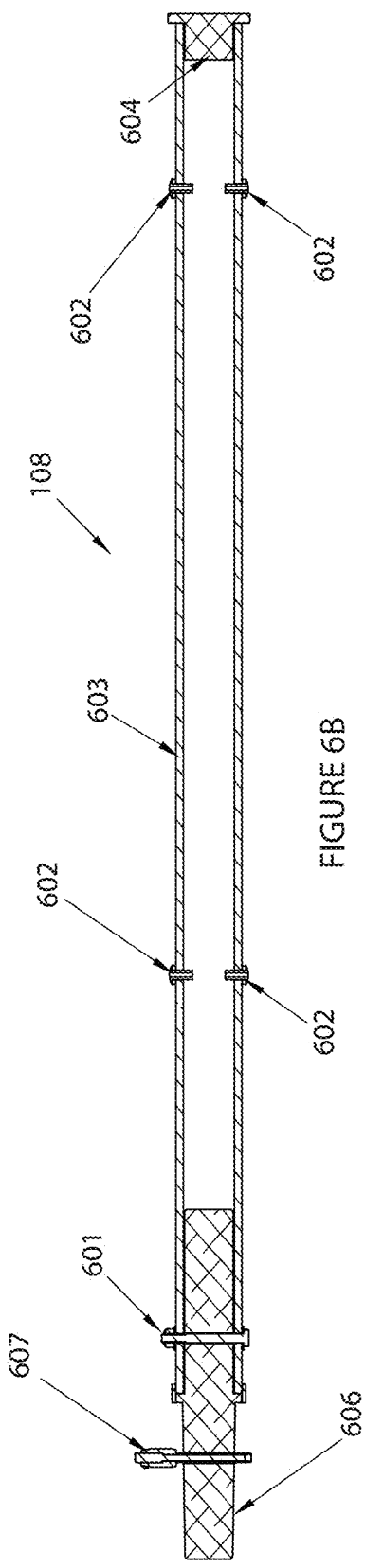
FIG. 6B is a side sectional view of the post assembly taken along line A-A in FIG. 6A.
Figure 7:
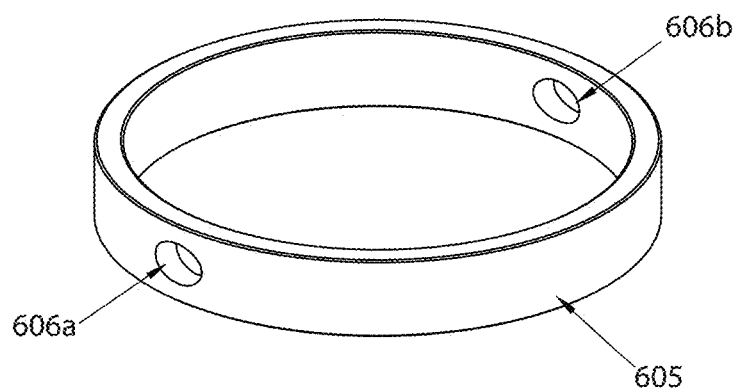
FIG. 7 is a perspective view of a collar element used in conjunction with the post assembly shown in FIG. 6A.
Figure 8:
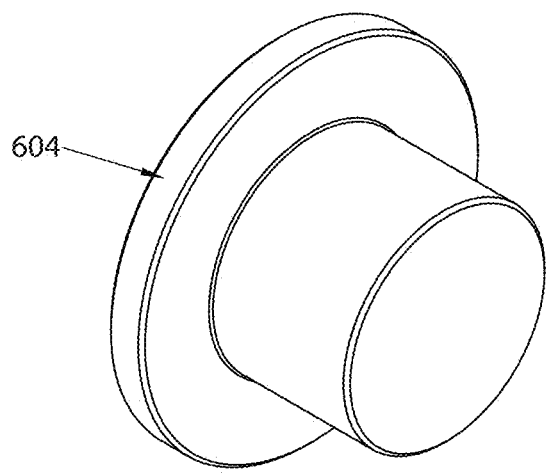
FIG. 8 is a perspective view of a cap element used in conjunction with the post assembly shown in FIG. 6A.

With regard to FIG. 6A, there is illustrated a side view of the post assembly 108 in accordance with the preferred embodiment of the present invention. As well, FIG. 6B is a side sectional view of the post assembly 108 taken along line A-A in FIG. 6A. The post assembly 108 includes a tube portion 603 that extends from a cap plug 604 at one end to a post spigot 606 at the opposite end. The post spigot is shown with a removable locking pin 607 as previously mentioned shown in place. The post spigot is retained in the end of the tube portion 603 via a thru-bolt 601. Collars 605 are retained along the tube portion 603 and are held in place via screws 602. The collars 605 serve to provide vertical support of the horizontally oriented brace assemblies as may be seen from FIG. 1. In FIG. 7, there is illustrated a perspective view of the collar 605 used in conjunction with the post assembly 108 shown in FIG. 6A. Here, the holes through which screws 602 may be seen. In FIG. 8, there is illustrated a perspective view of the cap plug 604 used in conjunction with the post assembly 108 shown in FIG. 6A.

Figure 9:
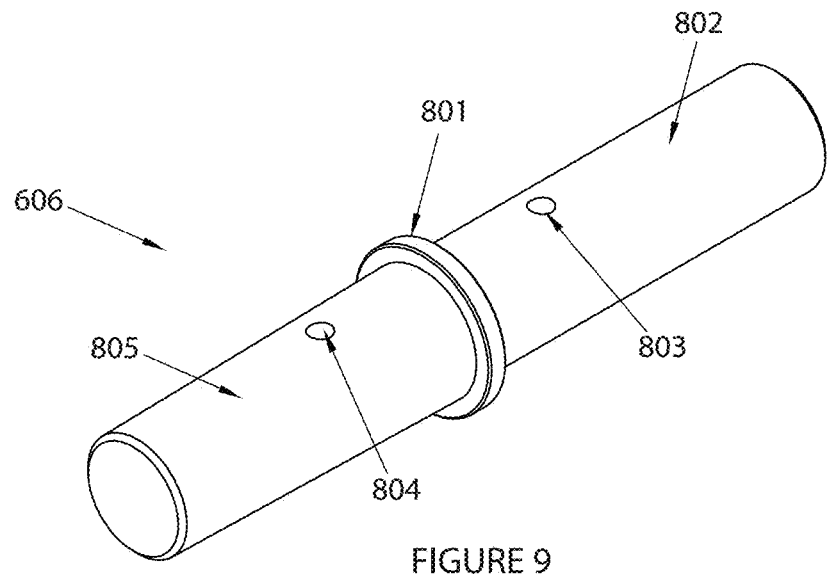
FIG. 9 is a perspective view of a post spigot element used in conjunction with the post assembly of the present invention.

With regard to FIG. 9, there is illustrated a perspective view of the post spigot 606 used in conjunction with the post assembly 108 of the present invention. The post spigot 606 includes an annular ridge 801 for abutment between the tube portion 603 of the post assembly 108 and the post holders 201 or 201a. The tube portion 603 is intended to slide over extension 802. Through holes 804 and 803 are also visible through which, respectively, removable locking pin 607 and thru-bolt 601 are held. It should be noted that the post spigot 606 also includes a tapered portion 805 that inserts into the post holder as illustrated in FIG. 1. This ensures a tight fit between the post assembly and the corresponding post holder, and ease of insertion and removal mitigating any friction that may occur. Furthermore, this also ensures hole alignment for the pin in the vertical direction.

Figure 10:
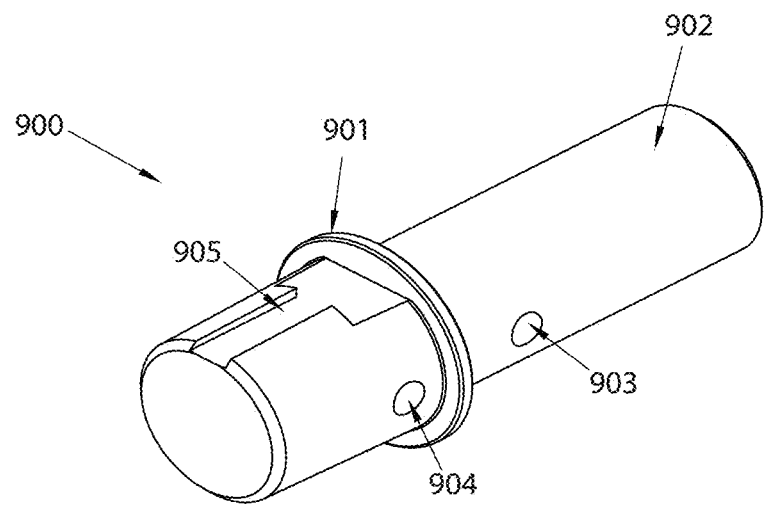
FIG. 10 is a perspective view of a brace spigot element used in conjunction with a brace assembly of the present invention.
Figure 11D:
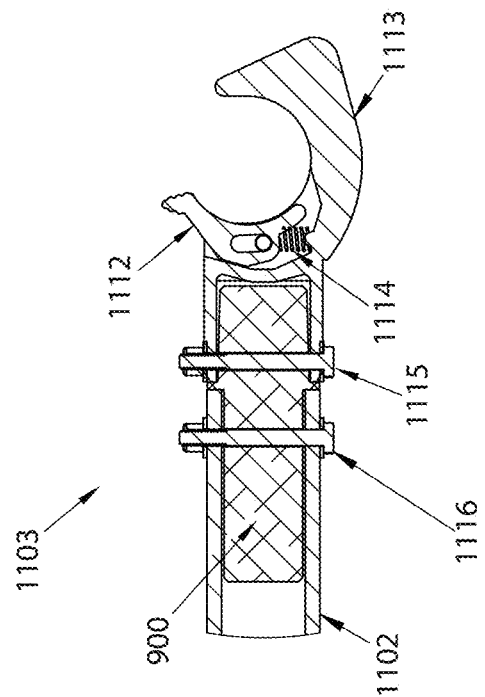
FIG. 11D is a close-up detail view of the brace assembly shown in FIG. 11B at detail E.

With regard to FIG. 10, there is illustrated a perspective view of a brace spigot 900 used in conjunction with a brace assembly of the present invention in a manner similar to the post spigot and seen in use within the close-up detail of FIG. 11D. Here, the brace spigot 900 includes an annular ridge 901, through holes 903 and 904 and retention channel 905.

Figure 11C:
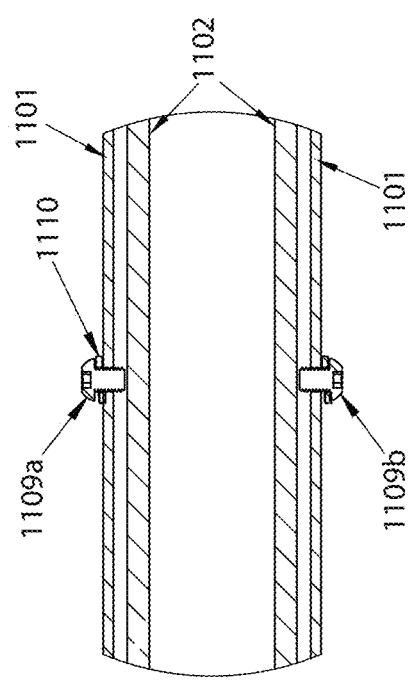
FIG. 11C is a close-up detail view of the brace assembly shown in FIG. 11B at detail C.

With regard to FIGS. 11A and 11B there are illustrated, respectively, a side view of a brace assembly and a side sectional view of the brace assembly taken along line B-B in FIG. 11. Here, hooks 1103 and 1105 are shown at opposite ends of the brace assembly. It should be understood that all brace assemblies are identical and interchangeable. The brace assembly includes an outer tube 1101 and an inner tube 1102 which are free to move relative to one another in both a telescoping longitudinal manner and a rotational concentric manner. In this way, adjustment of the overall length of the brace assembly may be obtained quickly and easily through the use of locking ring 1104.

Screws 1109a, 1109b are provided as a hard stop against the outer circumference of an internal plug 1106 during telescoping of the outer and inner tubes. Such screws 1109a, 1109b are shown with further reference to FIG. 11C where there is illustrated a close-up detail view of the brace assembly shown in FIG. 11B at detail C. Hook 1105 is retained in place with an attached core 1107 that is secured via screw 1108. The brace assembly may include as shown an internal plug 1106 which further helps pilot the inner tube 1102 within the outer tube 1101 and thereby reduce end play thereof.

With regard to FIG. 11D, there is illustrated a close-up detail view of the brace assembly shown in FIG. 11B at detail E. Here, the brace spigot is seen as the interface between the inner tube 1102 and the hook body 1113 and retained therein via thru-bolts 1115 and 1116. Hooks 1103 and 1105 function in the same manner, though the details of such function will only be described with regard to hook 1103. The hook body 1113 is fixed with respect to a movable claw 1112 that is retained in its position by spring 1114. Upon a user clipping the hook 1103 onto the tube of a post assembly, the movable claw 1112 opens sufficiently for the tube of the post assembly to be inserted and held securely by force of spring 1114 between the movable claw 1112 and the opposing hook body 1113. Effectively, the spring action allows for a snap fit of the hooks upon each post. In like reverse manner, a user may remove the brace assembly by manually prying the hook 1103 away from the tube of the post assembly with force sufficient to overcome the spring 1114.

Figure 11E:
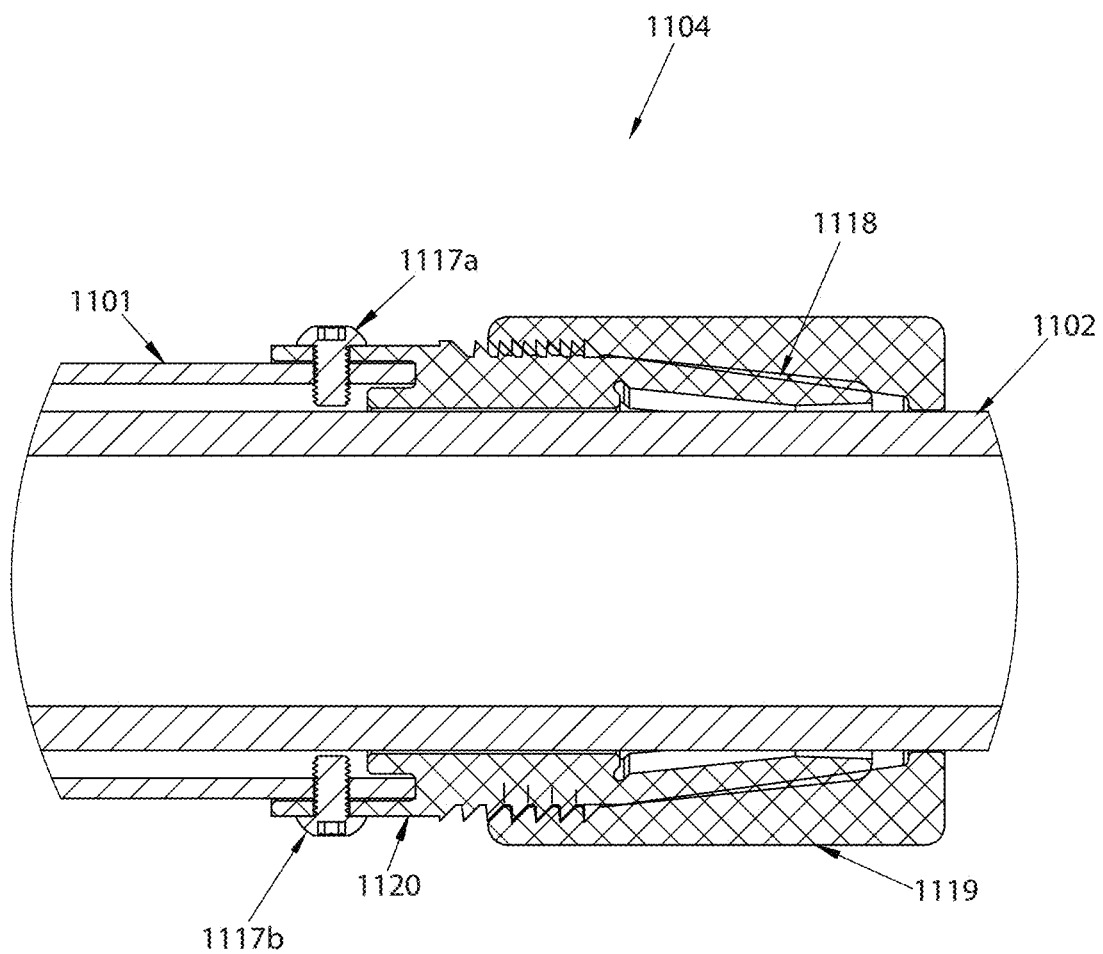
FIG. 11E is a close-up detail view of the brace assembly shown in FIG. 11B at detail D.

With regard to FIG. 11E, there is illustrated a close-up detail view of the brace assembly shown in FIG. 11B at detail D showing the locking ring 1104. The locking ring 1104 includes two opposing portions in the form of an outer ring 1119 and an inner ring 1120 which rotate together against one another at a conical compression interface 1118 that provides retention force against the outer surface of the inner tube 1102. The inner ring is fastened to the outer tube 1101 by way of screws 1117a and 1117b. Rotation in opposing directions will alternatively result in either locking the telescoping inner and outer tubes to preclude telescoping movement or unlocking them to enable telescoping movement.

Figure 12:
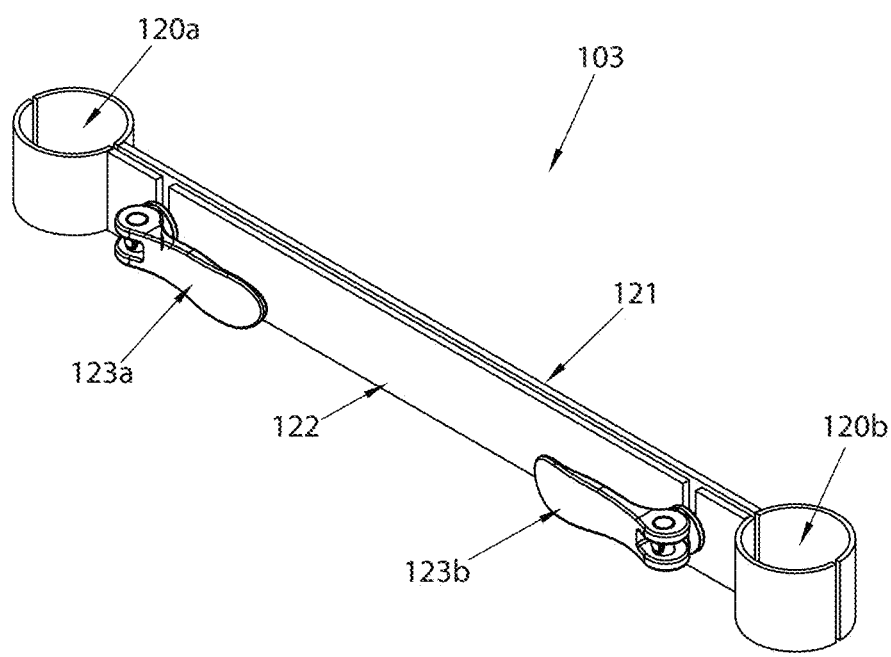
FIG. 12 is a perspective view of a midrail clamp assembly in accordance with the preferred embodiment of the present invention.
Figure 13A:
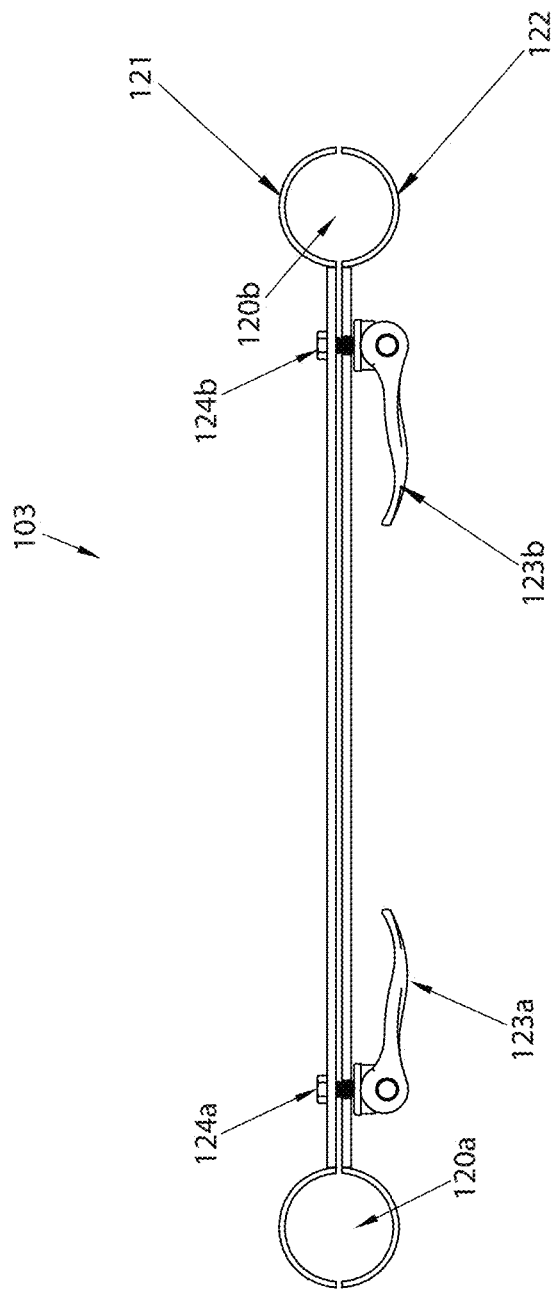
FIG. 13A is a top view of the midrail clamp assembly shown in FIG. 12.

With regard to FIG. 12, there is illustrated a perspective view of a midrail clamp assembly 103 in accordance with the preferred embodiment of the present invention. The midrail clamp assembly 103 includes three main parts involving a first clamp section 121 and a second clamp section 122. When combined, the clamps sections 121, 122 form brace retention areas 120a, 120b. Operation of levers 123a, 123b selectively ensure positive locking engagement and unlocking disengagement of the clamps sections 121, 122 on the corresponding brace assembly surfaces as shown in FIG. 1. With further regard to FIG. 13A, the top view of the midrail clamp assembly 103 is shown such that locking nuts 124a and 124b corresponding to the clamps sections 121, 122 are visible. Such structure and function of the levers 123a, 123b is analogous to the operation of quick-release skewers on bicycle wheels and typically described as "cam-locks"

Figure 13B:
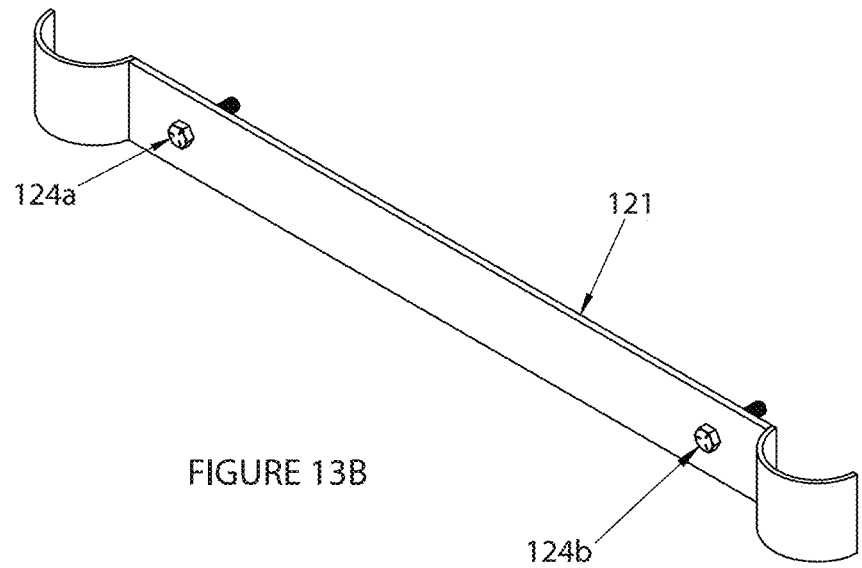
FIGS. 13B and 13C are perspective views of the half-section portions which together form the midrail clamp assembly shown in FIG. 12.
Figure 13C:
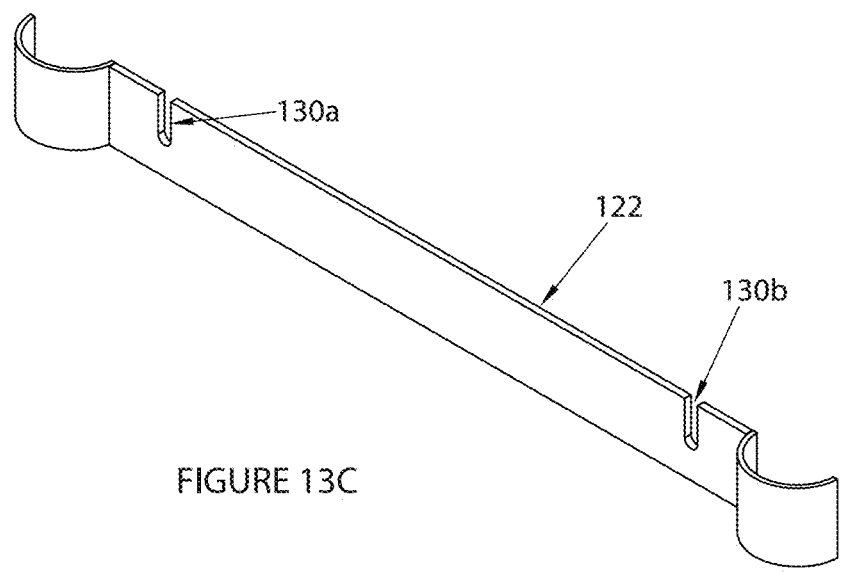

With regard to FIGS. 13B and 13C, there are illustrated perspective views of the half-section portions which together form the midrail clamp assembly shown in FIG. 12. Here, the locking nuts 124a and 124b retained in the first clamp section 121 are clearly seen along with the notches 130a, 130b formed in the second clamp section 122 through which the locking nuts pass.

The foregoing description of certain embodiments of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A guardrail apparatus for use with an electrical transformer, said apparatus comprising:
   a plurality of anchors, each anchor providing a post support and removably attachable to an edge of an electrical transformer;
   a plurality of post assemblies, each post assembly removably attached to a corresponding one of said anchors in a vertical orientation;
   a plurality of brace assemblies, each brace assembly removably attached to at least two of said post assemblies, and
   at least one midrail clamp assembly capable of providing removable attachment to two of said brace assemblies at a midpoint thereof, each midrail clamp assembly comprising a rigid member that extends continuously between two ends, each end being fixedly attached to one of the two brace assemblies.

2. The apparatus as claimed in claim 1 wherein said plurality of anchors are selected from a group consisting of a corner anchor assembly and a center anchor assembly.

3. The apparatus as claimed in claim 2 wherein each said anchor includes a plurality of clamping mechanisms for removable attachment to a peripheral edge of said electrical transformer.

4. The apparatus as claimed in claim 3 wherein said clamping mechanisms are formed by C-clamp structures.

5. The apparatus as claimed in claim 4 wherein said clamping mechanisms further include a threaded bolt and adjustment pad.

6. The apparatus as claimed in claim 5 wherein each said anchor forms a center anchor assembly.

7. The apparatus as claimed in claim 4 wherein each said anchor forms a corner anchor assembly.

8. The apparatus as claimed in claim 1 wherein each said brace assembly includes an inner tube and an outer tube arranged in a telescoping manner relative to one another.

9. The apparatus as claimed in claim 8 wherein each said brace assembly includes a locking ring to preclude telescoping movement of said inner tube and said outer tube relative to one another.

10. The apparatus as claimed in claim 1 wherein each said brace assembly includes two hooks located at opposing ends thereof, each said hook providing a snap fit manner of attachment and detachment to and from said post assemblies.

11. A kit for a guardrail apparatus used with an electrical transformer, said kit comprising:
   a plurality of anchors, each anchor capable of providing a post support and removable attachment to an edge of an electrical transformer;
   a plurality of post assemblies, each post assembly capable of providing removable attachment to a corresponding one of said anchors in a vertical orientation;
   a plurality of brace assemblies, each brace assembly capable of providing removable attachment to at least two of said post assemblies; and
   at least one midrail clamp assembly capable of providing removable attachment to exactly two of said brace assemblies at a midpoint thereof, each midrail clamp assembly comprising a rigid member that extends continuously between two ends, each end being fixedly attached to one of the two brace assemblies.

12. The kit as claimed in claim 11 wherein said plurality of anchors are selected from a group consisting of a corner anchor assembly and a center anchor assembly.

13. The kit as claimed in claim 12 wherein each said anchor includes a plurality of clamping mechanisms capable of providing removable attachment to a peripheral edge of said electrical transformer.

14. The kit as claimed in claim 13 wherein said clamping mechanisms are formed by C-clamp structures.

15. The kit as claimed in claim 14 wherein said clamping mechanisms further include a threaded bolt and adjustment pad.

16. The kit as claimed in claim 15 wherein each said anchor forms a center anchor assembly.

17. The kit as claimed in claim 14 wherein each said anchor forms a corner anchor assembly.

18. The kit as claimed in claim 11 wherein each said brace assembly includes an inner tube and an outer tube arranged in a manner capable of providing telescoping movement relative to one another.

19. The kit as claimed in claim 18 wherein each said brace assembly includes a locking ring capable of precluding telescoping movement of said inner tube and said outer tube relative to one another.

20. The kit as claimed in claim 11 wherein each said brace assembly includes two hooks located at opposing ends thereof, each said hook capable of providing a snap fit manner of attachment and detachment to and from said post assemblies.

21. A guardrail apparatus for use with an electrical transformer having permanently affixed thereto one or more post supports, said apparatus comprising:
   a plurality of post assemblies, each said post assembly configured to be removably attached in a vertical orientation to a corresponding post support of the electrical transformer;
   a plurality of brace assemblies, each said brace assembly removably attached to at least two of said post assemblies, and
   at least one midrail clamp assembly capable of providing removable attachment to exactly two of said brace assemblies at a midpoint thereof, each midrail clamp assembly comprising a rigid member that extends continuously between two ends, each end being fixedly attached to one of the two brace assemblies,
   wherein each said midrail clamp assembly includes two quick-release levers for attachment and detachment to and from said brace assemblies.

22. The apparatus as claimed in claim 21 wherein each said brace assembly includes an inner tube and an outer tube arranged in a telescoping manner relative to one another.

23. The apparatus as claimed in claim 22 wherein each said brace assembly includes a locking ring to preclude telescoping movement of said inner tube and said outer tube relative to one another.

24. The apparatus as claimed in claim 21 wherein each said brace assembly includes two hooks located at opposing ends thereof, each said hook providing a snap fit manner of attachment and detachment to and from said post assemblies.

* * * * *